(No Model.) 2 Sheets—Sheet 1.

T. D. BROWN.
AUTOMATIC BASTER.

No. 510,380. Patented Dec. 5, 1893.

Witnesses
L. C. Hills,
N. Moffett.

Inventor
Tristram D. Brown
By Glascock & Co
Attorneys.

THE NATIONAL LITHOGRAPHING COMPANY,
WASHINGTON, D. C.

(No Model.) 2 Sheets—Sheet 2.
T. D. BROWN.
AUTOMATIC BASTER.
No. 510,380. Patented Dec. 5, 1893.
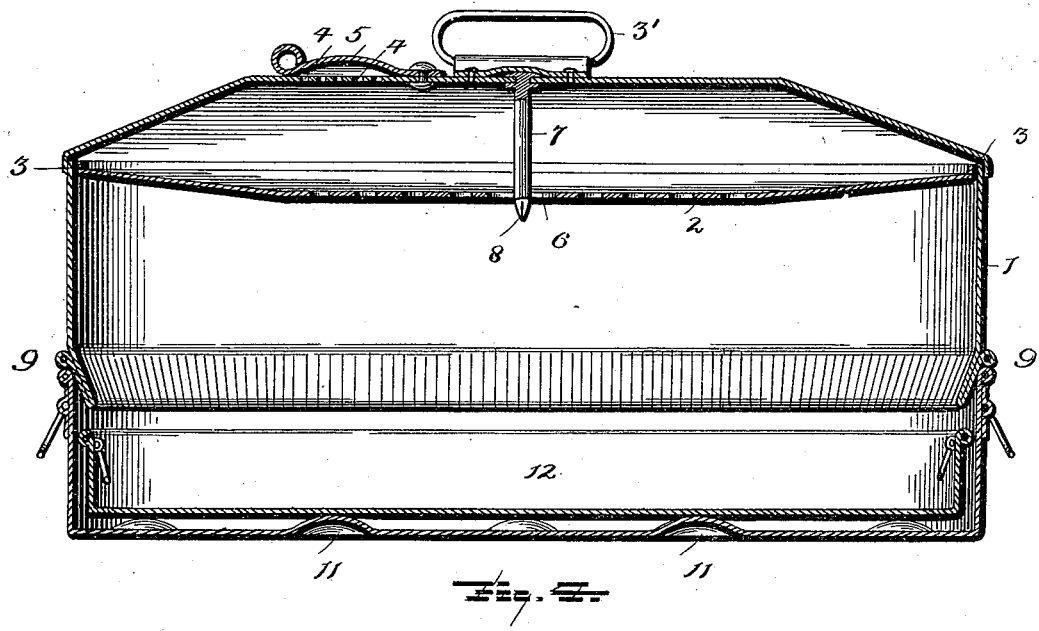
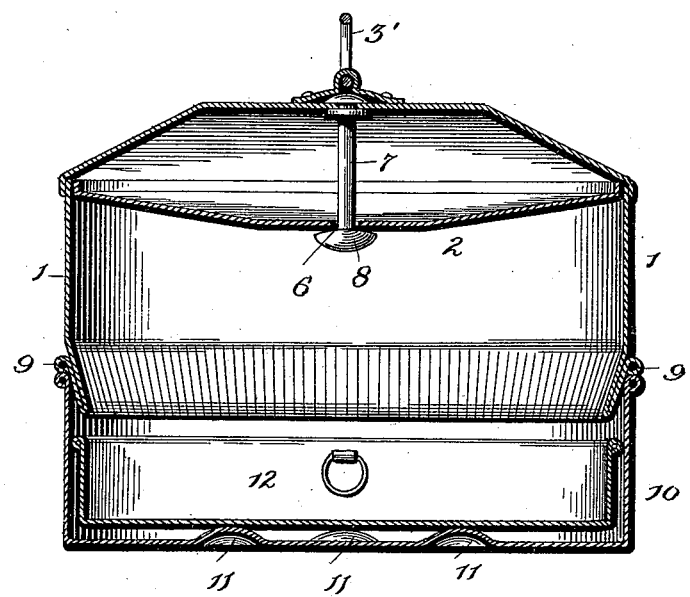
Witnesses
L. C. Hills
N. Moffett.
Inventor
Tristram D. Brown
By Glascock & Co.
Attorneys

United States Patent Office.

TRISTRAM D. BROWN, OF CANANDAIGUA, NEW YORK, ASSIGNOR TO THEODORE PERKINS, OF SAME PLACE.

AUTOMATIC BASTER.

SPECIFICATION forming part of Letters Patent No. 510,380, dated December 5, 1893.

Application filed February 4, 1893. Serial No. 460,947. (No model.)

*To all whom it may concern:*

Be it known that I, TRISTRAM D. BROWN, a citizen of the United States, residing at Canandaigua, in the county of Ontario and State of New York, have invented a certain new, useful, and valuable Improvement in Automatic Basters, of which the following is a full, clear, and exact description.

My invention has relation to automatic basting and roasting cooking utensils; said utensil adapted to condense the evaporation and return it in the form of moisture to the center of the roast.

Figure 1:
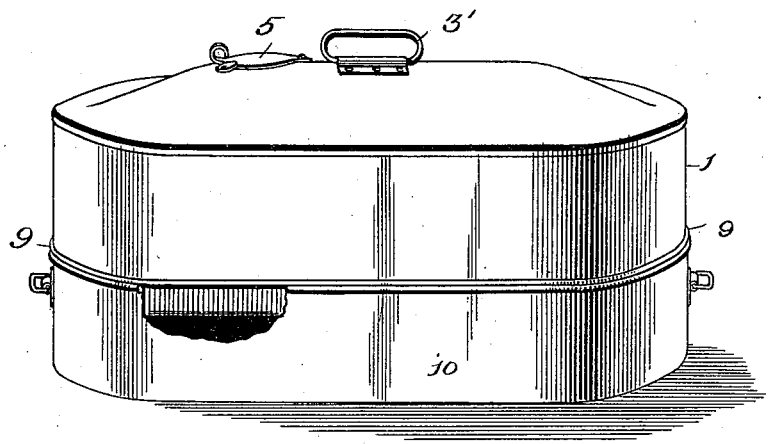
Figure 2:
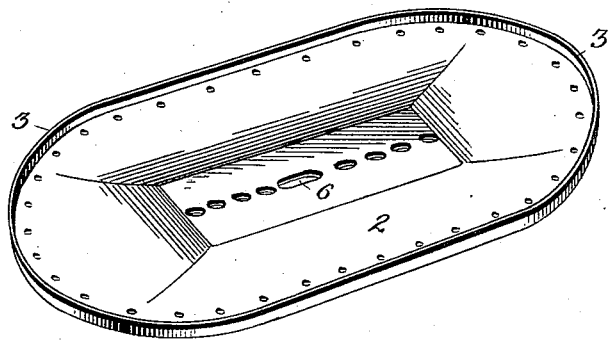

In the accompanying drawings:—Figure 1, is a perspective view of my invention, having a part cut away. Fig. 2, is a perspective view of the removable piece designed to fit in the top of the utensil. Fig. 3, is a longitudinal sectional view of the invention; and Fig. 4, is a transverse sectional view of the invention.

The utensil consists of the top 1, having in its upper part the removable piece 2. The top is provided with the handle 3', and also the perforations 4, with the pivoted cover 5, adapted to pass over them. The removable piece 2, is provided around its edge with the flange 3, and the lower surface of the said piece is substantially convex. The said piece is provided with suitable perforations as shown and in its center is the elongated perforation 6. In the center of the top is swiveled the rod 7. The lower end of said rod is provided with the T-shaped extension 8, which is adapted to pass down through the elongated perforation 6, and when turned at right angles to the longest diameter of the said perforation, the said rod 7, will retain the piece 2, in the top. The lower edges of the perpendicular sides of the top 1, are folded back upon themselves as shown in Figs. 3, and 4, and the extreme edges of the metal are wired at 9. Thus the lower edges of the top are made of two thicknesses of metal and these edges converge in toward the center of the utensil. (See Figs. 3, and 4.) The top 1, fits in the outside pan 10, which has in its bottom the raised places 11. The pan 12, rests on the raised places 11, and the lower edges of the top 1, extend in beyond the perpendicular of the sides of the pan 12.

The roast is placed in the pan 12, and the top 1, with the perforations 4, closed is placed over the roast. The utensil is then placed in an oven. The evaporation that arises from the contents of pan 12, will condense on the piece 2, and the moisture thus formed will run to the lowest point on the said piece and from there drip on the center of the roast. The moisture that forms on the perpendicular sides of the cover is conveyed into the pan 12, by the converging edges. When the roast is basted sufficiently the perforations 4, are opened and the most of the evaporation will pass out of the utensil without condensing and thus the roast is browned.

The upper part of the top 1, is arched as shown, to give that part greater strength. The advantage gained by having a removable piece 2, is that the utensil can be readily, easily, and thoroughly cleaned after using. The converging lower edges of the top 1, are fluted as indicated by the perpendicular lines. This together with the double thickness of metal gives the said lower edges great strength.

Having described my invention, what I claim as new, and desire to secure by Letters Patent, is—

1. An automatic basting utensil having the removable piece in its top; the removable piece having an elongated perforation a rod swiveled at its upper end in the upper part of the top, the lower end of said rod having a T-shaped extension adapted to enter the elongated perforation of the removable piece; said piece adapted to be retained in the top when said T-shaped extension is turned at right angles to the longest diameter of its elongated perforation substantially as set forth.

2. In an automatic basting utensil consisting of a pan and top, a removable sheet metal piece adapted to fit in the said top said piece having perforations and its lower surface substantially convex, an air space between the upper part of the top of the utensil and the said removable piece, perforations in the top of the utensil leading into the air space adapted to be closed by suitable means as set forth.

In testimony whereof I affix my signature in presence of two witnesses.

TRISTRAM D. BROWN

Witnesses:
CHARLES A. RICHARDSON,
JAMES A. ROBSON.